US006888595B2

(12) United States Patent
Umemoto

(10) Patent No.: US 6,888,595 B2
(45) Date of Patent: May 3, 2005

(54) REFLECTOR AND LIQUID-CRYSTAL DISPLAY DEVICE

(75) Inventor: Seiji Umemoto, Osaka (JP)

(73) Assignee: Nitto Denko Corporation, Osaka (JP)

( * ) Notice: Subject to any disclaimer, the term of this patent is extended or adjusted under 35 U.S.C. 154(b) by 429 days.

(21) Appl. No.: 09/781,278

(22) Filed: Feb. 13, 2001

(65) Prior Publication Data

US 2002/0033916 A1 Mar. 21, 2002

(30) Foreign Application Priority Data

Feb. 14, 2000 (JP) .................................. P2000-034958

(51) Int. Cl.[7] .......................................... G02F 1/1335
(52) U.S. Cl. ......................... 349/113; 349/67; 362/31; 359/599; 359/831; 359/707; 385/146; 385/116
(58) Field of Search .......................... 349/113, 67, 112; 359/60, 831, 833, 834; 362/31, 26, 28, 318; 385/146

(56) References Cited

U.S. PATENT DOCUMENTS

| 5,183,597 A | 2/1993 | Lu |
| 5,341,231 A | 8/1994 | Yamamoto et al. |
| 5,390,276 A | 2/1995 | Tai et al. |
| 5,461,547 A | 10/1995 | Ciupke et al. |
| 5,485,291 A | 1/1996 | Qiao et al. |

(Continued)

FOREIGN PATENT DOCUMENTS

| EP | 0 590 511 A1 | 4/1994 | |
| EP | 0 867 747 A2 | 9/1998 | |
| JP | 5-158033 | 6/1993 | ......... G02F/1/1335 |
| JP | 9297222 | 11/1997 | |
| JP | 10106328 | 4/1998 | |
| JP | 11142618 | 5/1999 | |
| JP | 2000147499 | 5/2000 | |
| JP | 2000-147499 | 5/2000 | ......... G02F/1/1335 |
| WO | WO 96/17207 A1 | 6/1996 | |
| WO | WO 97/01610 | 1/1997 | |
| WO | WO 97/30373 | 8/1997 | |
| WO | WO 97/47467 | 12/1997 | |
| WO | WO 98/00964 A2 | 1/1998 | |

OTHER PUBLICATIONS

Kevin Hathaway, et al, " Adavancements in Backlighting Technologies for LCDS", Proceedings High Resolution Displays & Projection Systems, Feb. 11, 1992, pp. 108–116, vol. 1664, San Jose, Bellingham, WA.
C.–Y. Tai, "Compact Front Lighting for Reflective Displays", SID Applications Digest, pp. 43–46, May 1996, Holland OH.
Patent Abstract of Japan 10–317570 May 26, 2000.
Patent Abstract of Japan 03–318989 Jun. 25, 1993.

*Primary Examiner*—Robert H. Kim
*Assistant Examiner*—P. R. Akkapeddi
(74) *Attorney, Agent, or Firm*—Sughrue Mion, PLLC

(57) ABSTRACT

A reflector has a transparent film, an adhesive layer disposed on one surface of the transparent film, a groove structure provided on the other surface of the transparent film, the groove structure having a plurality of grooves including optical path changing slopes aligned in a substantially constant direction at an inclination angle in a range of from 35 to 48 degrees with respect to a plane of the transparent film, a transparent cover film formed so as to cover an outer surface of the groove structure, and a light diffusing type reflection layer disposed on an outer surface of the cover film. A lighting-external light double mode liquid-crystal display device comprising the above reflector and a transmission type liquid-crystal panel, wherein the reflector is bonded to aback side (opposite to a viewing side) of the transmission type liquid-crystal panel through the adhesive layer of the reflector.

13 Claims, 1 Drawing Sheet

U.S. PATENT DOCUMENTS

| | | | |
|---|---|---|---|
| 5,485,354 A | 1/1996 | Ciupke et al. | |
| 5,584,556 A | 12/1996 | Yokoyama et al. | |
| 5,598,281 A * | 1/1997 | Zimmerman et al. | 349/5 |
| 5,671,994 A | 9/1997 | Tai et al. | |
| 5,712,694 A | 1/1998 | Taira et al. | |
| 5,727,107 A | 3/1998 | Umemoto et al. | |
| 5,808,713 A | 9/1998 | Broer et al. | |
| 5,897,184 A | 4/1999 | Eichenlaub et al. | |
| 5,945,209 A | 8/1999 | Okazaki et al. | |
| 5,961,198 A | 10/1999 | Hira et al. | |
| 5,999,685 A | 12/1999 | Goto et al. | |
| 6,044,196 A | 3/2000 | Winston et al. | |
| 6,060,183 A | 5/2000 | Higashi et al. | |
| 6,091,469 A * | 7/2000 | Naito | 349/113 |
| 6,147,732 A | 11/2000 | Aoyama et al. | |
| 6,196,692 B1 | 3/2001 | Umemoto et al. | |
| 6,236,439 B1 | 5/2001 | Saiki et al. | |
| 6,266,108 B1 * | 7/2001 | Bao et al. | 349/63 |
| 6,285,426 B1 * | 9/2001 | Akins et al. | 349/114 |
| 6,322,236 B1 | 11/2001 | Campbell et al. | |
| 6,340,999 B1 | 1/2002 | Masuda et al. | |
| 6,369,950 B1 | 4/2002 | Umemoto | |
| 6,384,881 B1 | 5/2002 | Arai et al. | |
| 2001/0010630 A1 | 8/2001 | Umemoto | |
| 2001/0011779 A1 | 8/2001 | Stover | |
| 2001/0012158 A1 | 8/2001 | Umemoto et al. | |
| 2001/0012159 A1 | 8/2001 | Umemoto et al. | |

* cited by examiner

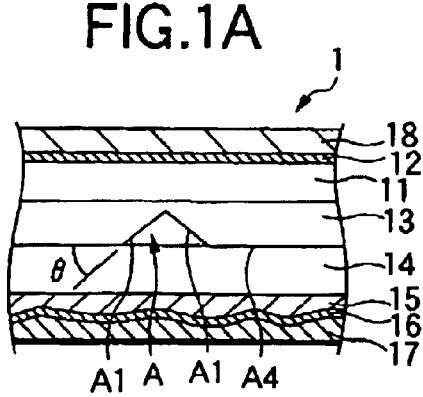
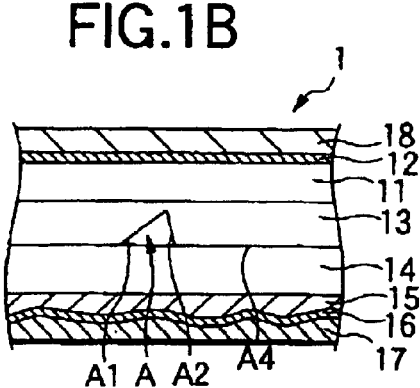
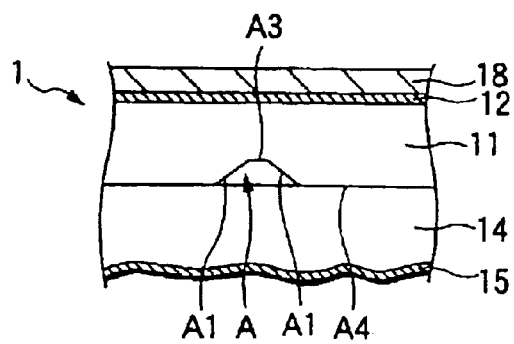
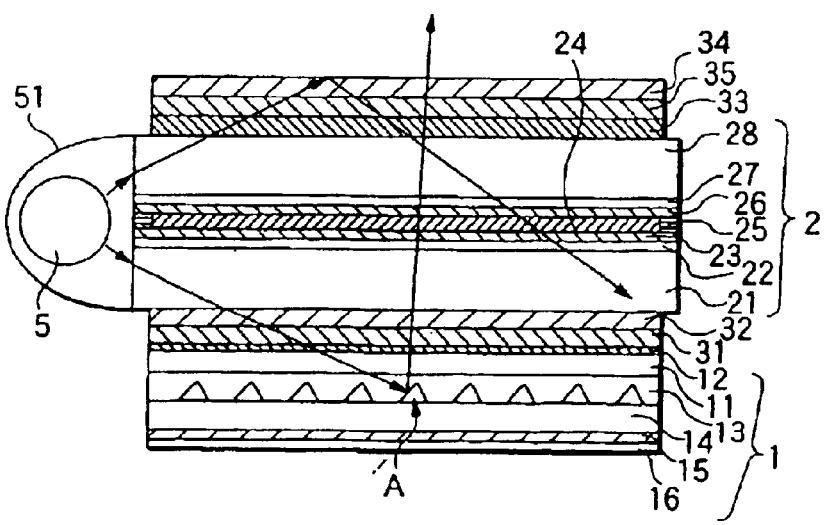

REFLECTOR AND LIQUID-CRYSTAL DISPLAY DEVICE

BACKGROUND OF THE INVENTION

1. Field of the Invention

The present invention relates to a reflector by which the optical path of light incident on one of side surfaces of a liquid-crystal display device is changed to a viewing direction efficiently, and with which it is possible to form a lighting-external light double mode liquid-crystal display device which is small in thickness, light in weight, bright and easy to view.

The present application is based on Japanese Patent Application No. 2000-34958, which is incorporated herein by reference.

2. Description of the Related Art

Greater reduction in thickness, size and weight of lighting-external light double mode liquid-crystal display devices has been demanded for the purpose of reduction in size and weight of portable personal computers and portable telephone sets, etc. In the mean while, it is difficult to reduce thickness, size and weight of a liquid-crystal display device provided with a front-lighting system using a background-art side-lighting type light pipe, because the light pipe needs to have a thickness of not smaller than 1 mm under the necessity of light transmission. The same difficulty is also applied to a liquid-crystal display device provided with a back-lighting system using a half-transmission type reflector because the device also uses such a side-lighting type light pipe which needs a considerable thickness.

In addition, in the case of a back-lighting system using a half-transmission type reflector, the addition of the half-transmission type reflector makes the volume and weight of the liquid-crystal display device larger. Moreover, light is diverged into transmitted light and reflected light by the half-transmission type reflector. There is there fore a problem that not only viewing in a lighting mode but also viewing in an external light mode becomes dark so that brightness of the display device using the half-transmission type reflector is inferior to that of a reflection exclusive type liquid-crystal display device using a high-reflectance reflection layer. Moreover, it is necessary to provide a gap between the light pipe and the liquid-crystal panel. This, as well as addition of a gap retaining mechanism, makes the volume and weight of the liquid-crystal display device larger.

SUMMARY OF THE INVENTION

An object of the present invention is to develop a reflector by which the optical path of light incident on one of side surfaces of a liquid-crystal display device is changed to a viewing direction efficiently, and with which it is possible to form a lighting-external light double mode liquid-crystal display device which is small in thickness, light in weight, bright and easy to view.

According to the present invention, there is provided a reflector comprising: a transparent film; an adhesive layer disposed on one surface of the transparent film; a groove structure provided on the other surface of the transparent film, the groove structure having a plurality of grooves including optical path changing slopes aligned in a substantially constant direction at an inclination angle in a range of from 35 to 48 degrees with respect to a plane of the transparent film; a transparent cover film formed so as to cover an outer surface of the groove structure; and a light diffusing type reflection layer disposed on an outer surface of the cover film. There is further provided a lighting-external light double mode liquid-crystal display device comprising: the reflector; and a transmission type liquid-crystal panel; wherein the reflector is bonded to a back side (opposite to a viewing side) of the transmission type liquid-crystal panel through the adhesive layer of the reflector.

The reflector according to the present invention is disposed on the back side (opposite to the viewing side) of a liquid-crystal panel having a light source on one of side surfaces of the panel. Hence, the optical path of the light incident on the side surface or the transmission light of the incident light is changed efficiently to the viewing direction of the liquid-crystal panel by optical path changing slopes formed in the reflector. Hence, the light can be utilized for liquid-crystal display. Moreover, because flat surface portions are disposed between the optical path changing slopes, external light can be made to enter efficiently through the flat surface portions. Hence, the entering external light is diffusively reflected by the reflection layer, and can be utilized for liquid-crystal display. Hence, it is possible to form a lighting-external light double mode liquid-crystal display device which is small in thickness, light in weight, bright and good in display quality.

The aforementioned effect is produced by an optical path control type reflector which mainly uses slope reflection to control the optical path of light. That is, the light incident on one of side surfaces of the liquid-crystal panel or the transmission light of the incident light is reflected by optical path changing slopes so that the optical path of the light can be changed with good directivity. Hence, good visibility in a lighting mode can be achieved. Moreover, flat surfaces can be disposed easily between the optical path changing slopes. Hence, external light is transmitted through the flat surfaces so that entering of external light can be ensured sufficiently. Hence, good visibility in an external light mode can be also achieved. In a method of scatter reflection by a roughened surface of a scattering sheet, or the like, it is difficult to achieve the aforementioned effect. Incidentally, Japanese Patent Publication No. Hei. 5-158033 discloses a reflection type liquid-crystal display device in which illumination light is made incident on one of side surfaces of a liquid-crystal panel and totally reflected by a viewing side cell substrate and in which the reflected light is scattered by a roughened surface type reflector so that the scattered light is utilized for display.

In the aforementioned case, however, light allowed to be utilized for display is one that exits from the panel due to coming contrary to the total reflection condition by scattering. Generally, scattered light exhibits a normal distribution having a direction of regular reflection as a peak, in Extended Abstracts (the 20th Liquid-Crystal Discussion Lecture) 3 G510, Tohoku University; Uchida et al. Hence, the aforementioned display light is greatly inclined with respect to a frontal (vertical) direction so that the light is difficult to be effectively utilized for display and the display becomes dark in the frontal direction. Nevertheless, intensifying scattering by the roughened surface type reflector is unfavorable for display in consideration of viewing in an external light mode. This is because the quality of light enclosed by the panel so as not to be allowed to exit from the panel is increased so that the quantity of light in the frontal direction in the external light mode is reduced. In the roughened surface scatter reflection method, it is, therefore, difficult to obtain scattering intensity favorable to both the light mode and the external mode because scattering intensity required of the lighting mode is antinomic to scattering intensity required of the external light mode.

On the other hand, according to the present invention, the optical path control type reflector, which uses slope reflection to control the optical path of light, mainly utilizes light exhibiting a peak in a direction of regular reflection and controls the optical path of the reflected light. Hence, directivity, especially frontal directivity, favorable for display can be provided easily, and a bright lighting mode can be achieved. Also in an external light mode, flat portions of the reflector except the optical path changing slopes can be utilized, and efficient entrance, reflection and transmission of external light can be ensured. Hence, the state of light can be balanced easily so as to be favorable to both lighting and external light modes. Further, the optical path changing slopes can be protected by a cover film so that grooves formed by the optical path changing slopes is hardly choked with dust. Hence, the aforementioned optical path changing function can be ensured for a long term.

Features and advantages of the invention will be evident from the following detailed description of the preferred embodiments described in conjunction with the attached drawings.

BRIEF DESCRIPTION OF THE DRAWINGS

In the accompanying drawings:

FIGS. 1A to 1C are explanatory side views showing examples of a reflector (optical path changing slopes); and FIG. 2 is an explanatory sectional view showing an example of a lighting-external light double mode liquid-crystal display device.

DETAILED DESCRIPTION OF THE PREFERRED EMBODIMENTS

The reflector according to the present invention comprises: a transparent film; an adhesive layer disposed on one surface of the transparent film; a groove structure provided on the other surface of the transparent film, the groove structure having a plurality of grooves including optical path changing slopes aligned in a substantially constant direction at an inclination angle in a range of from 35 to 48 degrees with respect to a plane of the transparent film; a transparent cover film formed so as to cover an outer surface of the groove structure; and a light diffusing type reflection layer disposed on an outer surface of the cover film. FIGS. 1A to 1C show examples of the reflector. A reflector 1 is constituted by a transparent film 11; an adhesive layer 12; a layer 13 of a structure of grooves A having optical path changing slopes A1, that is, a layer 13 of a repetitive structure of a plurality of optical path changing means A; a cover film 14; a light diffusing type reflection layer 16; a resin layer 15 having a finely roughened surface; a protective layer 17; and a release liner 18. As illustrated in FIG. 1C, the repetitive structure of optical path changing means A may be formed so as to be integrated with the transparent film 11.

As illustrated in FIG. 2, the reflector 1 is disposed on a back side (opposite to a viewing side) of a liquid-crystal panel 2 having a light source 5 on one of its side surfaces. That is, in a lighting mode, the light incident on the side surface from the light source or the transmission light of the incident light is reflected by the optical path changing slopes A1 as indicated by the arrow in FIG. 2. The optical path of the reflected light is changed toward a non-slope-forming surface of the transparent film 11, that is, toward the viewing direction of the liquid-crystal panel, so that the light is made to exit from the transparent film 11. The reflector 1 is provided for a purpose of being capable of utilizing the exit light as illumination light (display light) for the liquid-crystal panel, etc. In an external light mode, external light incident on a surface of the panel is reflected by the light diffusing type reflection layer. Hence, the reflector 1 is provided for another purpose of being capable of utilizing the reflected light as illumination light for the liquid-crystal panel, etc.

The transparent film 11 can be formed of a suitable material exhibiting transparency and corresponding to the wavelength range of light which is made to enter the film from the light source, or the like. Incidentally, examples of the suitable material used in a visible light range include: transparent resin represented by acrylic resin, polycarbonate resin, cellulose resin, norbornene resin, polyester resin, polyether-sulfone resin, polyamide resin, polyimide resin, polyolefin resin, polyether resin, polyvinyl chloride resin, styrene resin, or the like; curable resin such as acrylic resin, urethane resin, acrylic urethane resin, epoxy resin, silicone resin, or the like, which can be polymerized by heat, by ultraviolet rays, or by radial rays such as electron rays; and so on. Especially, a material exhibiting no birefringence or small birefringence is preferably used. Further, internal stress may occur in the transparent film in a bonding process. From the point of view to prevent a retardation from being produced due to the internal stress, the transparent film is preferably made of a material having a small photoelastic coefficient.

From the point of view to restrain luminance unevenness or color shading to obtain a liquid-crystal display device low in display unevenness, it is preferable to use the transparent film, as described above, having an average in-plane retardation of not larger than 40 nm. That is, when the transparent film 11 is made to have a small retardation as illustrated in FIG. 2, and linearly polarized light enters the transparent film 11 through a polarizer 31 or 34, or the like, the polarized state of the light can be kept satisfactory advantageously to prevent the display quality from being deteriorated. Incidentally, an ordinary film such as a polyester film exhibits a retardation of about 2000 nm. However, when linearly polarized light enters such a film having a large retardation through a polarizer, or the like, the film is influenced by the retardation so that the film may be rainbow-colored due to the color change in accordance with the incidence angle and the reflection angle, or so that the polarized state of light may be changed to make transmission efficiency or exit efficiency be lowered. As a result, display unevenness such as luminance unevenness and color shading occurs easily. From the point of view to prevent display unevenness, it is preferable that the average in-plane retardation of the transparent film is not larger than 30 nm, particularly not larger than 20 nm, more particularly not larger than 10 nm, and it is more preferable that the retardation varies in positions of the transparent film as little as possible.

Further, in consideration that the incidence angle of transmission light onto the transparent film is apt to exceed 45 degrees, the average thicknesswise retardation of the transparent film is apt to have an influence on the incidence angle in the same manner as that in the average in-plane retardation. Therefore, the average thicknesswise retardation is preferably not larger than 50 nm, more preferably not larger than 30 nm, further preferably not larger than 20 nm, from the point of view to prevent display unevenness. The transparent film with such a small retardation may be formed by a suitable method, for example, by a method in which internal optical strain is eliminated by an existing means for annealing a film.

Casting is a preferable method to form a transparent film with such a small retardation. Incidentally, it will go well if the aforementioned retardation condition in the transparent film can be satisfied in a region of the reflector used for display. The retardation condition need not be satisfied in the whole surface of the reflector. The retardation is preferably based on light in a visible range, particularly on light with a wavelength of 550 nm. The transparent film 11 may be formed as a laminate of two or more layers made of one kind of resin or made of different kinds of resins to control the retardation. That is, the transparent film 11 need not be formed as a one-piece single layer made of one kind of material as shown in FIG. 2. The thickness of the transparent film can be determined suitably. Generally, the thickness of the transparent film is preferably selected to be not larger than 300 µm, especially in a range of from 5 to 200 µm, more especially in a range of from 10 to 100 µm, from the point of view to achieve reduction in thickness of the reflector.

To achieve the aforementioned purpose, the transparent film 11 is provided with slopes A1 as shown in FIGS. 1A to 1C. The slopes A1 are provided on one side of the transparent film 11, and reflect the incident light on one of side surfaces or the transmission light of the incident light in a predetermined direction to thereby change the optical path of the light. On this occasion, from the point of view of obtaining illumination light excellent in frontal directivity through optical path change, the transparent film 11 is configured as shown in FIGS. 1A to 1C. That is, according to the present invention, the transparent film 11 is formed to have a repetitive structure of a plurality of optical path changing means A constituted by a structure of grooves (concave portions) containing optical path changing slopes A1 aligned in an approximately constant direction so as to be inclined at an inclination angle $\theta$ in a range of from 35 to 48 degrees with respect to a film plane A4.

FIGS. 1A to 1C show various examples of each of the plurality of optical path changing means A. In FIGS. 1A and 1B, each of the optical path changing means A is substantially shaped like a triangle in section. In FIG. 1C, each of the optical path changing means A is substantially shaped like a tetragon in section. More specifically, in FIG. 1A, each of the optical path changing means A has two optical path changing slopes A1 and is shaped like an isosceles triangle in section. In FIG. 1B, each of the optical path changing means A has an optical path changing slope A1, and a steep slope A2 having an inclination angle larger than that of the slope A1. On the other hand, in FIG. 1C, each of the optical path changing means A has two optical path changing slopes A1, and a flat surface A3.

The plurality of optical path changing means may be formed of concave portions constituted by equal-side surfaces or slopes having equal inclination angles as shown in the aforementioned examples. Alternatively, the plurality of optical path changing means may be formed from concave portions constituted by a combination of optical path changing slopes and steep or gentle slopes, or slopes different in inclination angle. The slope shape of the optical path changing means can be determined suitably corresponding to the number of incidence side surfaces and the position of each incidence side surface on which the light is incident. Therefore, the plurality of optical path changing means A may be formed as a repetitive structure of optical path changing means A which are adjacently continued to one another and which have, as repetition units, short-side optical path changing slopes A1, and long-side gentle slopes, especially slopes having an inclination angle of not larger than 10 degrees with respect to the film plane.

The reflector preferable from the point of view of achieving the aforementioned characteristic such as frontal directivity has optical path changing slopes A1 which are aligned in a substantially constant direction so as to face the incidence side surface on which the light is incident. Hence, when light is made incident on two or more side surfaces of the reflector, it is preferable to use a reflector having optical path changing slopes A1 corresponding to the number and positions of the incidence side surfaces.

Incidentally, when opposite side surfaces of the reflector are used as incidence side surfaces on which the light is incident, there may be preferably used a reflector 1 constituted by a plurality of optical path changing means containing two or more kinds of optical path changing slopes. Among the two or more kinds of optical path changing slopes, one kind of optical path changing slopes aligned in an approximately constant direction serve as a reference while another kind of optical path changing slopes are aligned in a direction opposite to the reference optical path changing slope. Examples of the reflector preferably used include: a reflector 1 constituted by a plurality of optical path changing means A each of which is substantially shaped like an isosceles triangle in section by two optical path changing slopes A1 as shown in FIG. 1A; and a reflector 1 constituted by a plurality of optical path changing means A each of which contains two optical path changing slopes A1 and each of which is substantially shaped like a trapezoid or a tetragon in section as shown in FIG. 1C so that the ridge lines of optical path changing slopes A1 are parallel to the incidence side surfaces respectively. Incidentally, the optical path changing slopes A1 may be formed so that the ridge-lines thereof are parallel to the perpendicularly and adjacently extending two incidence side surfaces of the reflector, or so that the ridge lines there of are parallel to the perpendicularly and adjacently extending three incidence side surfaces or more.

As described above, the optical path changing slopes A1 play a role of reflecting the light incident on the slopes A1, among the light incident on the side surface and the transmission light of the incident light, to thereby change the optical path of the light. In this case, when the inclination angle $\theta$ of each of the optical path changing slopes A1 with respect to the film plane is selected to be in a range of from 35 to 48 degrees as illustrated in FIG. 1A, the optical path of the light incident on the side surface or the transmission light of the incident light can be changed so as to be sufficiently perpendicular to the film plane. Accordingly, illumination light excellent in frontal directivity can be obtained efficiently.

If the inclination angle $\theta$ is smaller than 35 degrees, the optical path of the reflected light is largely shifted by 30 degrees or more from the frontal direction. Accordingly, the reflected light is difficult to be utilized effectively for display, and frontal luminance may therefore run short. On the other hand, if the inclination angle $\theta$ is larger than 48 degrees, the condition for total reflection of the light incident on the side surface or of the transmission light of the incident light cannot be satisfied. Accordingly, light leaking from the optical path changing slopes increases, and efficiency of utilization of the light incident on the side surface may therefore run short. From the point of view of optical path change excellent in frontal directivity, suppression of leaking light, etc., and in consideration of the condition for total reflection of the transmission light on the basis of refraction in Snell's law, the inclination angle $\theta$ of each of the optical path changing slopes A1 is preferably in a range of from 38 to 45 degrees, more preferably in a range of from 40 to 44 degrees.

The plurality of optical path changing means A having the optical path changing slopes A1 are formed as a repetitive structure for the purpose of reducing the thickness of the reflector. In this case, it is necessary to reflect the light incident on the side surface backward and transmit the reflected light toward the counter side surface efficiently so as to emit light on the whole surface of the reflector as uniformly as possible. From this point of view, it is preferable that the optical path changing means A are formed as a structure including flat surfaces which are constituted by gentle slopes inclined at an inclination angle of not larger than 5 degrees, particularly not larger than 4 degrees, more particularly not larger than 3 degrees with respect to the film plane, or which are constituted by surfaces A3 or film surfaces A4 inclined at an inclination angle of about 0 degree with respect to the film plane as shown in FIGS. 1A to 1C. Therefore, the optical path changing means A including steep slopes A2 as illustrated in FIG. 1B are preferably formed as a structure in which the angle of the steep slopes A2 is selected to be not smaller than 35 degrees, particularly not smaller than 50 degrees, more particularly not smaller than 60 degrees so that the width of the film surfaces A4 can be enlarged.

When the reflector 1 is disposed on the back side (opposite to the viewing side) of the transmission type liquid-crystal panel 2 as illustrated in FIG. 2, the flat surfaces can function as incidence portions on which external light is made incident and as transmission portions through which the reflected light of the incident light by the light diffusing type reflection layer 16 is transmitted. Hence, display can be made both in a lighting mode using the light source and in an external light mode using external light. Hence, a lighting-external light double mode liquid-crystal display device can be formed.

From the point of view of obtaining bright display in the above description, the projected area or width, on the film plane, of the flat surfaces A3 or film surfaces A4 each having an inclination angle of not larger than 5 degrees with respect to the film plane is selected preferably to be not smaller than 5 times, more preferably not smaller than 8 times, further preferably not smaller than 10 times as large as the projected area or width, on the film plane, of the slopes A1 or A2 each having an inclination angle of not smaller than 35 degrees with respect to the film plane on which the optical path changing means A are formed. This projected area or width selection is to improve efficiency of incidence of external light and efficiency of transmittance of the light reflected by the reflection layer.

The plurality of optical path changing means A are provided so that the ridgelines of the optical path changing means A are parallel to or inclined to the side surface on which light is incident. In this case, the optical path changing means A may be formed so as to be continued from one end to the other end of the transparent film, or may be formed intermittently and discontinuously. When the plurality of optical path changing means A are formed discontinuously, it is preferable from the point of view of efficiency of incidence of the transmission light, efficiency of changing the optical path, etc. that the length of the groove structure along the direction of the incidence side surface is selected to be not smaller than 5 times as large as the depth of the groove structure. It is further preferable from the point of view of uniform light emission on the reflector that the length is selected to be not larger than 500 $\mu$m, particularly in a range of from 10 to 480 $\mu$m, more particularly in a range of from 50 to 450 $\mu$m.

Any suitable surface shape such as a linear surface, a bent surface, a curved surface, etc., maybe formed as the shape of each of the slopes for constituting the optical path changing means A. The sectional shape of the optical path changing means A and the repetition pitch of the optical path changing slopes A1 are not particularly limited. They can be determined suitably in accordance with the uniformity of light emission on the reflector in a lighting mode because the optical path changing slopes A1 are factors for determining luminance in the lighting mode. They can be further determined suitably in accordance with the uniformity of light emission in an external light mode. Hence, the quantity of light the optical path of which is changed can be controlled on the basis of the distribution density of the slopes.

Therefore, the inclination angles of the slopes A1, A2, etc., may be uniform on the whole surface of the sheet, or may vary so that the optical path changing means A is enlarged as the location goes farther from the side surface on which the light is incident for the purpose of coping with absorption loss and attenuation of transmission light due to the optical path changing and making light emission on the reflector uniform. The optical path changing means A may be disposed at regular intervals of a predetermined pitch.

Alternatively, the optical path changing means A may be disposed at irregular intervals so that the pitch is shortened as the location goes farther from the side surface on which the light is incident. Accordingly, the distribution density of the optical path changing means A is made gradually higher. Alternatively, the optical path changing means A may be disposed at a random pitch so that light emission on the reflector can be made uniform. The random pitch is favorable to prevention of moire caused by interference with pixels. Therefore, the optical path changing means A maybe constituted by a structural combination of grooves different in shape, or the like, as well as pitch.

Unnatural display may be caused by shortage of transmission of display light if the optical path changings lopes A1 overlap pixels of the liquid-crystal panel. From the point of view of preventing the unnatural display from occurring, etc., it is preferable that the overlap area between the pixels and the slopes A1 is reduced as greatly as possible to thereby ensure sufficient light transmittance through the flat surfaces A3 or A4. From this point of view and in consideration that the pixel pitch of the liquid-crystal panel is generally in a range of from 100 to 300 $\mu$m, each of the optical path changing slopes A1 is selected preferably to be not larger than 40 $\mu$m, more preferably in a range of from 3 to 20 $\mu$m, further preferably in a range of from 5 to 15 $\mu$m in terms of the projected width on the film plane. The projected width is also preferable from the-point of view of preventing display quality from being lowered because of diffraction in consideration that the coherent length of a fluorescent tube is generally about 20 $\mu$m.

On the other hand, it is preferable from the afore mentioned point of view that the distance between adjacent ones of the optical path changing slopes A1 is large. As described above, however, the optical path changing slopes serve as a functional portion for substantially generating illumination light by changing the optical path of the light incident on the side surface. Hence, if the distance is too large, illumination becomes sparse in a lighting mode so that display maybe unnatural. In consideration of these facts, the repetition pitch of the optical path changing slopes A1 is preferably selected to be not larger than 5 mm, more preferably in a range of from 20 µm to 3 mm, further preferably in a range of from 50 µm to 2 mm.

Further, moire may occur because of interference between the repetitive structure of a plurality of optical path changing means and the pixels of the liquid-crystal panel. Although moire can be prevented by adjustment of the pitch in the repetitive structure of the optical path changing means, the pitch in the repetitive structure of the optical path changing means is limited to the aforementioned preferable range. Hence, measures against the case where moire still occurs even if the pitch is in the aforementioned range come into a question. According to the present invention, it is preferable to use a method in which the ridgelines of the groove structure are formed to be inclined with respect to the incidence side surface so that the groove structure can be arranged to cross the pixels to thereby prevent moire.

On this occasion, if the inclination angle to the incidence side surface is too large, deflection occurs in reflection by the optical path changing slopes A1. As a result, large deviation occurs in the direction of changing the optical path. This large deviation is apt to cause lowering of display quality. Therefore, the inclination angle of the ridgelines to the incidence side surface is selected preferably to be in a range of ±30 degrees, more preferably in a range of ±25 degrees, further preferably in a range of ±20 degrees. Incidentally, the symbol "±" means the direction of inclination of the ridgelines with the incidence side surface as a reference. If the resolution of the liquid-crystal display panel is so low that moire never occurs, or if moire is negligible, it is preferable that the ridgelines are arranged to be as parallel with the incidence side surface as possible.

The transparent film having the optical path changing means can be formed by a suitable method. Examples of the suitable method include: a method in which a thermoplastic resin is pressed against a mold capable of forming a predetermined shape by heating to thereby transfer the shape; a method in which a mold capable of forming a predetermined shape is filled with a hot-melted thermoplastic resin or a resin fluidized by heat or by a solvent; a method in which a fluid resin polymerizable by heat, by ultraviolet rays or by radial rays such as electron rays is polymerized in the condition that the fluid resin is filled or cast in a mold which is capable of forming a predetermined shape; and so on.

The preferable example of the method for forming the transparent film having the plurality of optical path changing means is a method in which a repetitive structure of grooves having optical path changing slopes is given to one surface of a transparent film by a mold having a predetermined structure of grooves. A specific example of the preferable method comprises the steps of: applying a curable resin polymerizable by ultraviolet rays, radial rays, or the like, onto one surface of a transparent film; curing the coating layer of curable resin by irradiation with ultraviolet rays, radial rays, or the like, while bringing the coating layer into close contact with a surface of the mold on which the predetermined structure of grooves is formed; and peeling off and collecting the transparent film from the mold.

The transparent film with the optical path changing means may be obtained by integral molding so that the transparent film is integrated with the optical path changing means as described above. Alternatively, the transparent film with the optical path changing means may be obtained by a method in which a layer 13 in which optical path changing means are formed is added to one surface of a transparent film 11 as illustrated in FIGS. 1A and 1B. In the latter case, if there is a large difference in refractive index between the added layer 13 of optical path changing means and the transparent film 11, light exit efficiency may be reduced greatly because of interface reflection, or the like. From the point of view to prevent the reduction of the light exit efficiency, it is preferable that the difference in refractive index between the transparent film and the layer of the optical path changing means is made as small as possible.

The refractive index difference is particularly preferably selected to be not larger than 0.10, especially not larger than 0.05. In addition, in this case, it is preferable that the refractive index of the added layer of optical path changing means is made higher than that of the transparent film from the point of view of the light exit efficiency. Incidentally, a suitable transparent material corresponding to the wavelength range of incident light from the light source, or the like, may be used to form the layer of the optical path changing means, similarly to the case of the transparent film.

As illustrated in FIGS. 1A to 1C, the reflector is designed to have an adhesive layer 12 on the surface of the transparent film 11 on which the structure of grooves A is not formed. Such an adhesive layer is to bond the reflector to a support member such as a liquid-crystal panel, or the like. The bonding process through the adhesive layer is performed for the following purposes: improvement of reflection efficiency by the optical path changing slopes A1 of the plurality of optical path changing means A; accordingly, improvement of luminance owing to effective utilization of the incident light on the side face; and so on.

A suitable tackiness agent can be used for the formation of the adhesive layer. The suitable tackiness agent contains, as a base polymer, a suitable polymer such as a rubber polymer, an acrylic polymer, a vinyl-alkyl-ether polymer, a silicone polymer, a polyester polymer, a polyurethane polymer, a polyether polymer, polyamide polymer, a styrene polymer, etc. Especially, a tackiness agent excellent in transparency, weather resistance, heat resistance, etc. such as an acrylic tackiness agent containing, as a base polymer, a polymer mainly containing alkyl ester of acrylic acid or methacrylic acid is used preferably to form the adhesive layer.

According to the present invention, an adhesive layer having a refractive index different by 0.12 or less, especially 0.10 or less, more especially 0.05 or less from the refractive index of the transparent film is used preferably from the point of view of preventing light from being enclosed by the reflector because of interface reflection based on the refractive index difference so as to be unable to exit, and suppressing the quantity of light loss owing to impossibility of light exit as described above. Suitable transparent particles may be mixed with the adhesive layer so that the adhesive layer can be provided as a light diffusing type adhesive layer. As the transparent particles, there can be used at least one member suitably selected from the group consisting of inorganic particles of silica, alumina, titania, zirconia, tin oxide, indium oxide, cadmium oxide, antimony oxide, or the like, which may be electrically conductive; and organic particles of a crosslinked or non-crosslinked polymer, or the like.

Incidentally, the release liner 18 may be preferably Temporarily bonded to the adhesive layer as shown in FIGS. 1A to 1C so that the adhesive layer is covered with the release liner 18 before the adhesive layer is put into practical use for the purpose of anti-contamination against deposition of foreign matters, etc. For the same reason as described above, the refractive index difference between the adhesive layer and the support member such as a liquid-crystal panel bonded to the adhesive layer is preferably selected to be not larger than 0.15, especially not larger than 0.10, more especially not larger than 0.05.

As shown in FIGS. 1A and 1B, the reflector is formed so that the groove-structure-forming surface 13 of the transparent film 11 is covered with a transparent cover film 14 for the purpose of protection of the optical path changing slopes especially from contamination. If the groove structure is choked with dust, the aforementioned optical path changing function is deteriorated so that grooves are apt to be choked with dust when the contaminant is wiped off. The cover film can be formed of a suitable material corresponding to the wavelength range of incident light from the light source, or the like, and exhibiting transparency to the light in the same manner as that in the transparent film.

As shown in FIGS. 1A to 1C, a light diffusing type reflection layer 16 is at least provided on the outside of the cover film 14. The reflected light of the incidence external light is diffused by the diffusing type reflection surface of the light diffusing type reflection layer 16 so that improvement of viewing in an external light mode can be attained. Incidentally, in mirror reflection, an image owing to external light from a light source, or the like, is directly viewed so that an image due to regularly reflected light overlaps light reflected on the surface of the liquid-crystal display device and a display image is apt to be hardly viewed.

For example, the light diffusing type reflection layer can be formed by a surface roughening method using sandblasting, matting, chemical etching, or the like; or by a method in which a resin layer is formed to have a fine prismatic structure surface by a suitable method such as a fine particle addition method, or the like, as exemplified in the diffusing type adhesive layer and in which a reflection layer in accordance with the fine prismatic structure is provided on the resin layer; and so on. The formation of the reflection layer into the fine prismatic structure can be performed by a method in which a reflection material such as a metal is deposited on the fine prismatic surface by a suitable thin-film-forming method, for example, a vapor deposition method such as a vacuum vapor deposition method, an ion plating method, a sputtering method, or the like, or a plating method.

A suitable material can be used as the reflection material. Especially, a high reflectance metal such as aluminum, silver, gold, copper, chromium, or the like, an alloy thereof, a dielectric multilayer film, etc. may be used as the reflection material. Incidentally, the fine prismatic surface for forming the light diffusing type reflection layer may be formed as a layer 15 to be added onto the cover film 14 as shown in FIGS. 1A and 1B or may be formed directly in the cover film by a suitable method such as a method of applying the aforementioned surface roughening method to one surface of the cover film or a method of transferring a roughened surface by using a mold having a roughened surface as shown in FIG. 1C.

The density of the fine prismatic structure in the reflection surface of the light diffusing type reflection layer can be determined suitably in accordance with reflection characteristic, etc. Generally, the prismatic structure pitch is preferably selected to be fine from the point of view of the provision of a dense and smooth reflection surface. Especially, the average pitch is preferably selected to be not larger than $1/3$, especially not larger than $1/4$ as large as the pixel size of the liquid-crystal panel from the point of view of suppression of moire, etc. Accordingly, the prismatic structure may be a fine structure with an average pitch of not larger than 50 $\mu$m. The shape of each of the prismatic structures can be also determined suitably. Generally, the average inclination angle of the prismatic structures is preferably selected to be in a range of from 4 to 12 degrees (SID 96 Digest pp.149–152) from the point of view of reflection strength in a viewing direction, distribution of reflection angles, etc.

In the above description, the method of providing a reflection layer directly in the groove structure of the transparent film has a problem that an emission point or an emission line caused by a scar occurs easily. Moreover, it is difficult to form the groove-structure-forming surface into a fine prismatic structure because the groove structure is delicate. Hence, the groove structure of the transparent film can hardly be formed also as a light diffusing type reflection layer. It is, therefore, necessary to provide a separate diffusing layer. On the other hand, the method of providing a separate reflector requires a support mechanism for stabilizing the reflection surface. Hence, this causes increase in volume and weight, and the distance between the reflector and the liquid-crystal layer for forming an image becomes so large that parallax becomes large. Moreover, the groove structure cannot be protected so that the concave portions are choked with the contaminant. Hence, the optical path changing function is apt to be disturbed and a scar is apt to be generated. Therefore, the cover film method according to the present invention prevents such a problem from being induced.

Incidentally, the light diffusing type reflection layer may be provided by a post-addition method in which the reflection layer is added to the cover film bonded to the surface where the groove structure is formed. Alternatively, the reflection layer may be provided in the cover film before the cover film is bonded to the surface where the groove structure is formed. As shown in FIGS. 1A and 1B. the light diffusing type reflection layer 16 may be covered with a protective film 17 for the purpose of protection of the light diffusing type reflection layer 16. The protective layer can be formed by a suitable method such as a film bonding method, a coating method using resin coating, or the like.

The reflector according to the present invention acts so that the optical path of light incident on a side surface from the light source, or the like, or the transmission light of the incident light is changed, by the optical path changing slopes, to a direction excellent in perpendicularity favorably for viewing. Hence, the light can be made to exit with good light-utilizing efficiency. Moreover, the reflector exhibits both good transmission characteristic with respect to external light and good diffuse reflection characteristic owing to the light diffusing type reflection layer. As shown in FIG. 2, the reflector 1 is bonded, through its adhesive layer 12, to the back side (opposite to the viewing side) of the transmission type liquid-crystal panel 2 in which at least one light source 5 is disposed on at least one of side surfaces of the panel 2. That is, the reflector 1 is bonded to the transmission type liquid-crystal panel 2 so that the optical path changing slopes A1 of the reflector 1 face the side surface where the at least one light source 5 is disposed. Thus, there can be provided various devices such as a lighting-external light double mode liquid-crystal display device which is bright, easy to view and excellent in power saving.

Incidentally, in accordance with the liquid-crystal display device, a greater part of incident light on the side surface from the light source 5 is transmitted backward through the upper and lower transparent cell substrates 21 and 28 by reflection according to the rule of refraction on the basis of the thickness proportion of the respective layers in the liquid-crystal panel 2. Hence, the optical path of the light incident on the optical path changing slopes A1 of the reflector 1 is efficiently changed to a viewing direction, especially to a frontal direction while light is prevented from exiting (leaking) from the panel surface. The residual part of the light is transmitted backward by total reflection and made incident on the optical path changing slopes A1 in the back side. Hence, the optical path of the light is efficiently changed to the viewing direction. Hence, display excellent in uniformity of brightness on the whole surface of the panel display screen can be achieved in a lighting mode.

In the above description, a suitable transmission type panel can be used as the liquid-crystal panel 2. The panel is not particularly limited in kind. That is, there can be used a panel which at least has liquid crystal 24 enclosed by transparent cell substrates 21 and 28 through a sealing material 25 and by which incident light on one side where the reflector 1 is disposed is made to exit as display light from the other side through control of liquid crystal, etc., as shown in FIG. 2.

Incidentally, specific examples of the liquid-crystal panel include a twisted or non-twisted liquid-crystal panel such as a TN liquid-crystal panel, an STN liquid-crystal panel, an IPS liquid-crystal panel, an HAN liquid-crystal panel, an OCB liquid-crystal panel, or a VA liquid-crystal panel; a guest-host or ferroelectric liquid-crystal panel; a light diffusing type liquid-crystal panel; and so on. Further, a suitable drive method such as an active matrix method or a passive matrix method maybe used as the method for driving liquid crystal. As illustrated in FIG. 2, the liquid crystal is generally driven through transparent electrodes 22 and 27 provided on the inner surfaces of the pair of cell substrates 21 and 28.

A suitable transparent substrate such as a glass substrate or a resin substrate can be used as each of the cell substrates. Especially, a transparent substrate made of an optically isotropic material is preferably used from the point of view of display quality, etc. A substrate such as a non-alkali glass plate exhibiting excellent colorlessness and transparency with respect to a blue glass plate is preferably used from the point of view of improvement of luminance and display quality, etc. A resin substrate is preferably used from the point of view of reduction in weight, etc. The thickness of the cell substrate can be determined suitably in accordance with enclosing strength of liquid crystal, or the like, without any particular limitation. The thickness of the cell substrate is generally selected to be in a range of from 10 $\mu$m to 5 mm, especially in a range of from 50 $\mu$m to 2 mm, more especially in a range of from 100 $\mu$m to 1 mm, from the point of view of balance between light transmission efficiency and reduction in thickness and weight.

When the liquid-crystal panel is formed, at least one suitable functional layer may be provided as occasion demands. Examples of such a suitable functional layer include an aligned film made of a rubbed film for aligning the liquid crystal, a color filter for color display, and so on. Incidentally, aligned films 23 and 26 are generally formed on the transparent electrodes 22 and 27 respectively as shown in FIG. 2. A color filter not shown is generally provided between one of the cell substrates 21 and 28 and corresponding one of the transparent electrodes 22 and 27.

At least one suitable optical layer such as polarizers 31 and 34, retarders 32 and 33, a light diffusing layer, or the like, may be added to the liquid-crystal panel, as illustrated in FIG. 2. The polarizers are provided for achievement of display by using linearly polarized light. The retarders are provided for improvement of display quality by compensation for retardation due to birefringence of liquid crystal, etc. The light diffusing layer is provided for the following purposes: enlargement of a display range by diffusion of display light, uniformity of luminance by leveling of emission-line-like light emission through slopes of the reflector, increase of the quantity of light entering the reflector by diffusion of transmission light in the liquid-crystal panel, etc.

A suitable plate can be used as the polarizer without any particular limitation. From the point of view of obtaining good-contrast-ratio display due to incidence of highly linearly polarized light, etc., a film high in the degree of polarization may be preferably used. Examples of the preferable film include: an absorption type polarizing film made of a drawn film having a dichromatic material such as iodine or dichromatic dye adsorbed on a hydrophilic macromolecular film such as a polyvinyl alcohol film, a partially formalized polyvinyl alcohol film or a partially saponified ethylene-vinyl acetate copolymer film; a film in which a transparent protective layer is provided on one side or each side of the aforementioned absorption type polarizing film, or the like. A material excellent in transparency, mechanical strength, thermal stability, moisture shielding characteristic, etc. is preferably used for the formation of the transparent protective layer. Examples of the material include resins exemplified in the description of the transparent film. The transparent protective layer may be bonded as a film by a bonding method or may be applied as polymer liquid by a coating method, and so on.

The polarizer to be used, especially the viewing side polarizer may be subjected to non-glare treatment or anti-reflection treatment for preventing viewing from being disturbed because of surface reflection of external light. Non-glare treatment can be made to form a surface of the polarizer as a fine groove structure. In the non-glare treatment, various methods may be used for forming a surface of the polarizer as a fine groove structure. Examples of the methods include: a surface roughening method such as a sandblasting method, an embossing method, etc.; a method of mixing transparent particles such as silica particles; and soon. Anti-reflection treatment can be made by a method of forming a coherent vapor deposition film, or the like. Alternatively, non-glare treatment and anti-reflection treatment can be made on a surface structure of fine grooves or by a method of bonding a film having an interference film. Incidentally, two polarizers may be provided on opposite sides of the liquid-crystal panel respectively as shown in FIG. 2, or one polarizer maybe provided on only one side of the liquid-crystal panel.

When both non-glare treatment and anti-reflection treatment are given to the polarizer, to set the position of the non-glare treatment in the inside of the anti-reflection treatment is favorable from the point of view of improvement of viewing, etc. In this case, the non-glare treatment may be performed with a hard resin such as an urethane acrylic ultraviolet-curable resin so that hard coating characteristic can be provided to improve adhesion in the anti-reflection treatment. Moreover, the non-glare treatment may be performed with a high-refractive-index resin, especially with a resin having a refractive index of not lower than 1.55, so that the effect of the anti-reflection treatment can be improved.

On the other hand, each of the retarders may be formed of a suitable material. Examples of the material include a birefringence film obtained by drawing a film of a suitable polymer as illustrated in the description of the transparent film by a suitable method such as monoaxial drawing or biaxial drawing; an aligned film of a suitable liquid-crystal polymer such as a nematic liquid-crystal polymer or a discotic liquid-crystal polymer, and an aligned layer of the aligned film supported by a transparent base material. A material having a refractive index controlled in a direction of thickness under the operation of heat shrinkage force of a heat-shrinkable film may be also used to form the retarder.

The compensatory retarders 32 and 33 shown in FIG. 2 are generally disposed between the back side polarizer 31 and the liquid-crystal panel 2 and between the viewing side polarizer 34 and the liquid-crystal panel 2, respectively, as occasion demands. A suitable material can be used as each of the retarders corresponding to the wavelength range, etc. Each of the retarders may be formed of a laminate of two or more layers in order to control optical characteristic such as retardation, etc.

A coating layer, a diffusing sheet, or the like, having a surface structure of fine prismatic structures similarly to that of the light diffusing type reflection layer or that of the non-glare layer can be used to form the light diffusing layer by a suitable method. The light diffusing layer may be disposed as an adhesive layer 35 prepared in the same manner as that in the transparent-particles-containing adhesive layer 12. In this case, the light diffusing layer serves also as a layer for bonding the polarizer 34 and the retarder 33 to each other, as shown in FIG. 2. Hence, reduction in thickness of the liquid-crystal display device can be achieved. Although the light diffusing layer can be disposed on the outer side than the viewing side polarizer 34, arrangement of the light diffusing layer between the viewing side polarizer 34 and the reflector 1 as shown in FIG. 2 is more favorable than arrangement of the light diffusing layer on the outer side than the viewing side polarizer 34. This is because external light is made to enter the light diffusing layer after being absorbed by the polarizer so that reflection loss caused by backward scattering through the light diffusing layer can be suppressed.

On the other hand, the light source or illuminator disposed on one of side surfaces of the liquid-crystal panel is provided so that light to be utilized as light for illuminating the liquid-crystal display device is made incident on the side surface of the liquid-crystal panel. Hence, reduction in thickness and weight of the liquid-crystal display device can be achieved when the light source or illuminator is used in combination with the reflector disposed on the back side of the panel. A suitable-material can be used as the light source. Examples of the light source preferably used include a linear light source such as a (cold or hot) cathode tube, a point light source such as a light-emitting diode, an array of point light sources arranged in line or plane, and a combination of a point light source and a linear light pipe for converting the incident light from the point light source into light of a linear light source through the linear light pipe.

One light source 5 may be disposed on one of side surfaces of the liquid-crystal panel 2 as shown in FIG. 2, or light sources maybe disposed on two or more side surfaces of the liquid-crystal panel 2. When light sources are disposed on a plurality of side surfaces, the plurality of side surfaces may be provided as a combination of side surfaces opposite to each other, or maybe provided as a combination of side surfaces crossing each other. Further, the plurality of side surfaces maybe provided as a combination of three or more side surfaces by use of the aforementioned combinations together.

The light source makes it possible to view the liquid-crystal display device in a lighting mode in which the light source is switched on. When the liquid-crystal display device is provided as a lighting-external light double mode liquid-crystal display device, the light source can be switched on/off because the light source is not necessary to be switched on in the case where the display device is viewed in an external light mode by using external light. Any suitable method can be used for switching on/off the light source. Any one of background-art methods may be used. Incidentally, the light source may be of a multicolor light emission type in which the color of emitted light can be changed. Or different types of light sources maybe provided so that multicolor light emission can be made through the different types of light sources.

As shown in FIG. 2, the light source 5 may be used in combination with a suitable assisting means such as a reflector 51. The reflector 51 is provided for enclosing the light source 5 to lead scattered light to the side surface of the liquid-crystal panel 2 as occasion demands. A suitable reflection sheet such as a resin sheet provided with a high-reflectance metal thin film, a white sheet, a sheet of metal foil, etc. may be used as the reflector. The reflector may be used also as a fixing means for enclosing the light source by a method of bonding end portions of the reflector to end portions of the cell substrates or the like of the liquid-crystal panel correspondingly.

In the present invention, optical devices or parts such as a liquid-crystal panel, polarizers, retarders, etc. for forming the liquid-crystal display device may be wholly or partially integrally laminated/fixed onto one another or may be disposed separately. From the point of view of prevention of lowering of contrast by suppression of interface reflection, etc., it is preferable that such optical devices or parts are closely fixed onto one another. A suitable transparent adhesive agent such as a tackiness agent can be used for the closely fixing these optical devices or parts. The transparent adhesive layer may contain the above-mentioned transparent particles, etc., so as to be an adhesive layer exhibiting a diffusing function. The optical devices or parts, especially viewing side optical devices or parts, may be formed to have ultraviolet-ray absorbing power by a method of treatment with an ultraviolet-ray absorbent such as a salicylic ester compound, a benzophenone compound, a benzotriazole compound, a cyanoacrylate compound, a nickel complex salt compound, etc.

EXAMPLE 1

A mold processed into a predetermined shape in advance was filled with acrylic ultraviolet-curable resin (ARONIX UV-3701, made by TOAGOSEI Co., Ltd.) by dropping with a dropper. An 80 $\mu$m-thick triacetylcellulose (TAC) film (surface-saponified substance) was stationery on the resin and made in close contact with the resin by a rubber roller so that excessive resin and bubbles were removed. The resin was irradiated with ultraviolet rays by a metal halide lamp so as to be cured. Then, the resin cured thus was peeled off from the mold and cut into a predetermined size. Thus, there was obtained a transparent film in which a repetitive layer of a plurality of optical path changing means having a refractive index of 1.533 was formed on one surface of the TAC film having a refractive index of 1.49.

Then, a mold having a surface roughened by sandblasting was used so that a resin layer having a surface fine prismatic structure was provided on a saponified surface of a 40 $\mu$m-thick TAC film in the same manner as described above. The TAC film with the resin layer was cut into a predetermined size. A silver film was provided on the fine prismatic surface by a vacuum vapor deposition method to form a light diffusing type reflection layer. Thus, a cover film having the light diffusing type reflection layer was formed. The cover film was bonded to the optical-path-changing-means-forming surface, constituted by a structure of grooves, of the aforementioned transparent film through a polyvinyl alcohol adhesive agent so that the reflection layer of the cover film was disposed outside. An adhesive layer having a refractive index of 1.47 was attached to the surface of-the transparent film on which the optical path changing means were not provided. Thus, a reflector was obtained.

The reflector was 60 mm wide and 45 mm deep, and had a plurality of optical path changing means (FIG. 1B) forming continuous grooves at intervals of a pitch of 210 μm. The ridgelines of the grooves were parallel with one another in the width wise direction. The grooves had optical path changing slopes A1, and steeps lopes A2. Each of the optical path changing slopes A1 was inclined at an inclination angle in a range of from 42.5 to 43 degrees and had a width in a range of from 8 to 13 μm. Each of the steep slopes A2 was inclined at an inclination angle in a range of from 67 to 67.5 degrees. The projected area of flat portions A4 on the film plane was not smaller than 9.8 times as large as the total projected area of the optical path changing slopes A1 and steep slopes A2 on the film plane (FIG. 1B).

Next, polarizers were stuck to front and back surfaces of a commercially available transmission type TN liquid-crystal panel. The aforementioned reflector was bonded to the outer side of the back side (opposite to the viewing side) polarizer through the adhesive layer of the reflector. A cold-cathode tube was disposed on one of side surfaces of the normally white transmission type TN liquid-crystal display panel, and enclosed by a reflector made of a silver-vapor-deposited reflective sheet. The opposite end portions of the reflector were bonded to the upper and lower surfaces of the panel so that the cold-cathode tube was fixed. Thus, a lighting-external light double mode liquid-crystal display device was obtained. Incidentally, the reflector was disposed so that the optical path changing slopes of the reflector face and are parallel to the cold-cathode tube.

EXAMPLE 2

A mixture of 90 parts (parts by weight, the same rule is also applied hereinafter) of polyester acrylate, 100 parts of ultraviolet-curable resin containing 10 parts of polyurethane acrylate, 10 parts of silica with a mean particle size of 1.5 μm, 3 parts of organic clay and 5 parts of an acetophenone polymerization initiator was prepared through 125 parts of toluene. A 50 μm-thick TAC film was coated with the silica dispersion by gravure coating so that the thickness of the silica dispersion on the TAC film was 10 μm. The solvent was removed from the silica dispersion at 80° C. for 2 seconds. Then, the silica dispersion was cured by irradiation with ultraviolet rays. Thus, a resin layer having a surface fine prismatic structure was formed. The TAC film with the resin layer was cut into a predetermined size. Then, silver vapor deposition was applied onto the fine prismatic surface to form a light diffusing type reflection layer. Thus, a cover film having the light diffusing type reflection layer was obtained. A reflector and a lighting-external light double mode liquid-crystal display device were obtained in the manner similar to that in Example 1 except that the cover film was used in Example 2.

COMPARATIVE EXAMPLE 1

A lighting-external light double mode liquid-crystal display device was obtained in the manner similar to that in Example 1 except that the reflector in Example 1 was replaced by a cover film having a light diffusing type reflection layer.

COMPARATIVE EXAMPLE 2

A lighting-external light double mode liquid-crystal display device was obtained in the manner similar to that in Example 1 except that the reflector in Example 1 was replaced by a reflection layer which was directly formed on the optical-path-changing-means-forming surface of the transparent film.

COMPARATIVE EXAMPLE 3

A reflector was obtained in the manner similar to that in Example 1 except the following points. The reflector had a plurality of optical path changing means disposed at regular intervals of a pitch of 210 μm. The plurality of optical path changing means had optical path changing slopes A1 each inclined at an angle of about 30 degrees and each having a width in a range of from 7 to 11 μm, and steep slopes A2 each inclined at an angle of about 70 degrees. The projected area of flat portions on the film plane was not smaller than 8.1 times as large as the total projected area of the optical path changing slopes A1 and steep slopes A2 on the film plane. A lighting-external light double mode liquid-crystal display device was obtained by using the reflector.

COMPARATIVE EXAMPLE 4

A reflector was obtained in the manner similar to that in Example 1 except the following points. The reflector had a plurality of optical path changing means disposed at regular intervals of a pitch of 210 μm. The plurality of optical path changing means had optical path changing slopes A1 each inclined at an angle of about 50 degrees and each having a width in a range of from 10 to 16 μm, and steep slopes A2 each inclined at an angle of about 70 degrees. The projected area of flat portions on the film plane was not smaller than 9.9 times as large as the total projected area of the optical path changing slopes A1 and steep slopes A2 on the film plane. A lighting-external light double mode liquid-crystal display device was obtained by using the reflector.

COMPARATIVE EXAMPLE 5

A lighting-external light double mode liquid-crystal display device was obtained in the manner similar to that in Example 1 except that a cover film without the provision of any light diffusing type reflection layer was used in Comparative Example 5.

COMPARATIVE EXAMPLE 6

A lighting-external light double mode liquid-crystal display device was obtained in the manner similar to that in Example 1 except that a cover film having a mirror reflection layer directly formed thereon without the provision of any resin layer having a surface fine prismatic structure was used in Comparative Example 6.

Evaluation Test

Frontal luminance in the center portion of the lighting-external light double mode liquid-crystal display device obtained in each of Examples 1 and 2 and Comparative Examples 1 to 6 was measured in a dark room by a luminance meter (BM-7 made by TOPCON Corp.) in the lighting mode in which the cold-cathode tube was switched on while the liquid-crystal panel was supplied with no voltage.

Results of the aforementioned measurement were shown in the following Table.

| | Frontal Luminance (cd/m²) | | | | | | |
|---|---|---|---|---|---|---|---|
| Example | | Comparative Example | | | | | |
| 1 | 2 | 1 | 2 | 3 | 4 | 5 | 6 |
| 24 | 22 | 2 | 26 | 8 | 4 | 26 | 24 |

It is apparent from the Table that frontal luminance in each of Examples 1 and 2 and Comparative Examples 2, 5 and 6 was superior to that in any one of Comparative Examples 1, 3 and 4. In Comparative Examples 1, 3 and 4, light was made to exit in a direction reverse to the light source at a large angle so that the exit light hardly contributed to display because of poor luminance in the frontal direction. Particularly in Comparative Example 1, the quantity of exit light was so small that very dark display was obtained. Also with respect to viewing in a lighting mode in the condition that the liquid-crystal panel was supplied with a voltage, good display quality without any trouble was achieved in any one of Examples 1 and 2 and Comparative Examples 2, 5 and 6.

On the other hand, in an external light mode in which the cold-cathode tube was switched off and in which external light by using ring-like illumination was made incident on the liquid-crystal panel, bright and good display without disorder of an image was obtained in any one of Examples 1 and 2 and Comparative Examples 1, 3 and 4 in the condition that the liquid-crystal panel was supplied with a voltage. In Comparative Example 5, there was, however, no reflected light sufficient to form a display image. In Comparative Example 2 or 6, the ring-like illumination was made so sharp by mirror reflection that brightness varied largely. As a result, it was very hard to view the liquid-crystal panel because of the light reflected by the surface of the panel. If the viewing point was shifted from the direction of regular reflection to avoid the surface reflection, the display became dark so as to be hardly viewed.

It is proved from the above description that good display is achieved both in a lighting mode and in an external light mode in Examples 1 and 2. Accordingly, it is proved that a lighting-external light double mode liquid-crystal display device good in display quality can be achieved according to the present invention while reduction in thickness and weight by a film method is achieved to avoid increase in volume and weight owing to the light pipe.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A reflector comprising:
   a transparent film;
   an adhesive layer disposed on one surface of said transparent film;
   a groove structure provided on the other surface of said transparent film, said groove structure having a plurality of grooves including optical path changing slopes aligned in a substantially constant direction at an inclination angle in a range of from 35 to 48 degrees with respect to a plane of said transparent film;
   a transparent cover film formed so as to cover an outer surface of said groove structure; and
   a light diffusing type reflection layer disposed on an outer surface of said cover film.

2. A reflector according to claim 1, wherein said optical path changing slopes are constituted by at least two kinds of slopes in which one kind of slopes aligned in a substantially constant direction serve as a reference while the other kind of slopes are aligned substantially in a direction opposite to said one kind of slopes;
   said adhesive layer is covered with a release liner; and
   said light diffusing type reflection layer is made of a metal thin film or dielectric multilayer film provided on a fine prismatic surface.

3. A reflector according to claim 1, wherein said inclination angle of each of said optical path changing slopes with respect to said film plane is in a range of from 38 to 45 degrees.

4. A reflector according to claim 1, wherein each of said grooves is shaped substantially like an isosceles triangle, or a triangle other than said isosceles triangle, or a tetragon in section.

5. A reflector according to claim 1, wherein said groove structure further includes flat surfaces each of which is inclined at an inclination angle of at most 5 degrees with respect to said film plane, and
   a projected area, on said film plane, of said flat surfaces is at least 5 times as large as a projected area, on said film plane, of said slopes each having an inclination angle of at least 35 degrees.

6. A reflector according to claim 1, wherein said groove structure is constituted by continuous grooves extended from one end of the film to the other end thereof or by discontinuous grooves each having a length at least 5 times as large as a depth of each of said discontinuous grooves and having optical path changing slopes formed in a direction of the length of said discontinuous grooves.

7. A reflector according to claim 1, wherein ridgelines of said optical path changing slopes are parallel to or inclined within an angle range of ±0.30 degrees with respect to one side of said transparent film.

8. A reflector according to claim 1, wherein said adhesive layer is of a light diffusing type.

9. A lighting-external light double mode liquid-crystal display device comprising:
   a reflector according to claim 1; and
   a transmission type liquid-crystal panel,
   wherein said reflector is bonded to a back side (opposite to a viewing side) of said transmission type liquid-crystal panel through said adhesive layer of said reflector.

10. A liquid-crystal display device according to claim 9, further comprising a light source disposed on at least one of side surfaces of said transmission type liquid-crystal panel, said side surface facing said optical path changing slopes of said reflector.

11. A double mode liquid-crystal display device, comprising:
   a transrmission-type liquid-crystal panel having a viewing side and a back side opposite the viewing side; and
   a reflector including:
      a transparent film having two surfaces;
      an adhesive layer disposed on one surface of the transparent film and bonding the reflector to the back side of the transmission-type liquid-crystal panel;
      a groove structure provided on the other surface of the transparent film and having a plurality of grooves, each groove including optical path changing slopes at an inclination angle with respect to a plane of the other surface of the transparent film;

a transparent cover film having an inner surface located adjacent the other surface of the transparent film and an outer surface opposite the inner surface; and a light diffusing type reflection layer disposed on the outer surface of the transparent cover film.

12. The double mode liquid-crystal display device of claim 11, wherein the inclination angle of each groove is in a range of from 35 to 48 degrees with respect to the plane of the other surface of the transparent film.

13. The double mode liquid-crystal display device of claim 11, wherein the transparent cover film has a substantially planar configuration.

* * * * *